(12) United States Patent
Ogasawara et al.

(10) Patent No.: US 6,735,375 B1
(45) Date of Patent: May 11, 2004

(54) DATA RECORDING AND REPRODUCING APPARATUS

(75) Inventors: Jin Ogasawara, Tokyo (JP); Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/580,199

(22) Filed: May 26, 2000

(30) Foreign Application Priority Data

Jun. 4, 1999 (JP) .......................................... 11-158669

(51) Int. Cl.[7] .............................. H04N 5/91; H04N 7/00
(52) U.S. Cl. ............................................. 386/46; 80/81
(58) Field of Search .............................. 386/46, 68, 69, 386/81, 80, 123, 124, 129, 1, 6, 35, 37, 40; 360/69, 73.01; H04N 5/91, 7/06

(56) References Cited

U.S. PATENT DOCUMENTS 5,065,259 A * 11/1991 Kubota et al. ................. 360/32
5,278,706 A * 1/1994 Iketani et al. .................. 360/70
6,292,846 B1 * 9/2001 Hara et al. ...................... 710/5

FOREIGN PATENT DOCUMENTS

EP 0417609 * 3/1991

* cited by examiner

Primary Examiner—Robert Chevalier
(74) Attorney, Agent, or Firm—Louis Woo

(57) ABSTRACT

A data recording and reproducing apparatus includes a rotary head for recording a signal on a tape-like recording medium while successively forming tracks thereon, and for reproducing a signal from the tape-like recording medium. Each of the tracks has a front margin area, an effective data area, and a rear margin area. A flag is generated which represents which of different speeds the rotary head rotates at. The generated flag is inserted into the signal before the signal is recorded on the tape-like recording medium by the rotary head. Thereby, the flag is recorded on the effective data area. A data rate of the signal recorded on the tape-like recording medium is maintained at a constant rate independent of which of the different speeds the rotary head rotates at. An amount of data recorded on the rear margin area is controlled in response to which of the different speeds the rotary head rotates at to cause the tracks to be equal in length independent of which of the different speeds the rotary head rotates at.

8 Claims, 8 Drawing Sheets

DATA RECORDING AND REPRODUCING APPARATUS

BACKGROUND OF THE INVENTION

1. Field of the Invention

This invention generally relates to a data recording and reproducing apparatus. This invention particularly relates to an apparatus for recording and reproducing digital data on and from a tape-like recording medium by using a rotary head. In addition, this invention relates to a recording medium such as a tape-like recording medium loaded with digital data.

2. Description of the Related Art

There are video signals having a frame frequency of 29.97 Hz and video signals having a frame frequency of 30 Hz.

A background-art data recording and reproducing apparatus which is not prior art against this invention is capable of handling both a video signal of the 29.97-Hz type and a video signal of the 30-Hz type. The background-art apparatus includes a rotary head via which a video signal is recorded on a magnetic tape. The recording operation of the background-art apparatus can be changed between a 29.97-Hz mode for a video signal of the 29.97-Hz type and a 30-Hz mode for a video signal of the 30-Hz type. During the 29.97-Hz recording mode of operation of the background-art apparatus, a video signal of the 29.97-Hz type is recorded while the rotary head is rotated at a speed of 29.97 rps. During the 30-Hz recording mode of operation, a video signal of the 30-Hz type is recorded while the rotary head is rotated at a speed of 30 rps. A special flag is added to a video signal before the video signal is recorded. The special flag represents whether the recorded video signal is of the 29.97-Hz type or the 30-Hz type.

A reproducing side of the background-art apparatus includes a first equalizer designed exclusively for a video signal which has been recorded by the 29.97-Hz recording mode and also a second equalizer designed exclusively for a video signal which has been recorded by the 30-Hz recording mode. At a start of the reproduction of a video signal from the magnetic tape, a special flag is detected from the reproduced video signal. When the special flag represents that the reproduced video signal is of the 29.97-Hz type, the rotary head is rotated at a speed of 29.97 rps. In addition, the reproduced video signal is processed by the first equalizer. When the special flag represents that the reproduced video signal is of the 30-Hz type, the rotary head is rotated at a speed of 30 rps. In addition, the reproduced video signal is processed by the second equalizer.

Since the background-art apparatus has two equalizers (the first and second equalizers), the structure of the background-art apparatus is complicated. In addition, the background-art apparatus is expensive.

SUMMARY OF THE INVENTION

It is a first object of this invention to provide an improved data recording and reproducing apparatus.

It is a second object of this invention to provide an improved recording medium.

A first aspect of this invention provides a data recording and reproducing apparatus comprising a rotary head for recording a signal on a tape-like recording medium while successively forming tracks thereon, and for reproducing a signal from the tape-like recording medium, wherein each of the tracks has a front margin area, an effective data area, and a rear margin area; first means for generating a flag representing which of different speeds the rotary head rotates at; second means for inserting the flag generated by the first means into the signal before the signal is recorded on the tape-like recording medium by the rotary head to record the flag on the effective data area; and third means for maintaining a data rate of the signal recorded on the tape-like recording medium at a constant rate independent of which of the different speeds the rotary head rotates at, and for changing an amount of data recorded on the rear margin area in response to which of the different speeds the rotary head rotates at to cause the tracks to be equal in length independent of which of the different speeds the rotary head rotates at.

A second aspect of this invention provides a data recording and reproducing apparatus comprising a rotary head for recording a signal on a tape-like recording medium while successively forming tracks thereon, and for reproducing a signal from the tape-like recording medium, wherein each of the tracks has a front margin area, an effective data area, and a rear margin area; first means for generating a flag representing which of different speeds the rotary head rotates at; second means for inserting the flag generated by the first means into the signal before the signal is recorded on the tape-like recording medium by the rotary head to record the flag on the effective data area; third means for maintaining a data rate of the signal recorded on the tape-like recording medium at a constant rate independent of which of the different speeds the rotary head rotates at, and for changing an amount of data recorded on the rear margin area in response to which of the different speeds the rotary head rotates at to cause the tracks to be equal in length independent of which of the different speeds the rotary head rotates at; an equalizer for subjecting the signal reproduced by the rotary head to a waveform equalization process, and for outputting a signal representing a result of the waveform equalization process; a phase-locked loop for generating a channel clock signal on the basis of the signal outputted by the equalizer; and fourth means for extracting the flag from the signal outputted by the equalizer, for controlling rotation of the rotary drum in response to the extracted flag, and for controlling feed of the tape-like recording medium in response to the extracted flag to maintain a channel bit rate of the signal reproduced by the rotary head at a constant rate independent of which of the different speeds the rotary head rotates at.

A third aspect of this invention is based on the first aspect thereof, and provides a data recording and reproducing apparatus wherein the different speeds relate to two different frequency values between which a frame frequency of the signal recorded by the rotary head is changeable.

A fourth aspect of this invention provides a tape-like recording medium having tracks successively formed by a rotary head while a signal is recorded on the tracks by the rotary head, wherein each of the tracks has a front margin area, an effective data area, and a rear margin area, the effective data area being loaded with a flag representing which of different speeds the rotary head rotates at, wherein recording of the signal on the tracks by the rotary head is executed under conditions where a data rate of the signal recorded by the rotary head is maintained at a constant rate independent of which of the different speeds the rotary head rotates at, and an amount of data recorded on the rear margin area is controlled in response to which of the different speeds the rotary head rotates at to cause the tracks to be equal in length independent of which of the different speeds the rotary head rotates at.

A fifth aspect of this invention provides an apparatus comprising first means for recording a digital video signal on a recording tape while successively forming tracks on the tape, the digital video signal having a changeable frame frequency, the digital video signal having a sequence of 1-track-corresponding portions assigned to the respective tracks, wherein each of the 1-track-corresponding portions includes a margin signal; second means for maintaining a data rate of the digital video signal which is being recorded by the first means at a constant rate independent of the frame frequency of the digital video signal; and third means for changing a number of bits of the margin signal and a recording density of the digital video signal on the tape in response to the frame frequency of the digital video signal.

A sixth aspect of this invention is based on the fifth aspect thereof, and provides an apparatus further comprising fourth means for generating a flag representing whether the frame frequency of the digital video signal is equal to a first predetermined value or a second predetermined value; and fifth means for inserting the flag generated by the fourth means into the digital video signal before the digital video signal is recorded by the first means.

A seventh aspect of this invention is based on the fifth aspect thereof, and provides an apparatus wherein the margin signal comprises a dummy signal.

An eighth aspect of this invention provides an apparatus comprising first means for reproducing a digital video signal from a recording tape, the digital video signal having a frame frequency changeable between a first predetermined value and a second predetermined value, the digital video signal containing a flag representing whether the frame frequency of the digital video signal is equal to the first predetermined value or the second predetermined value; an equalizer for subjecting the digital video signal reproduced by the first means to a waveform equalization process independent of whether the frame frequency of the digital video signal is equal to the first predetermined value or the second predetermined value, and for outputting a signal representing a result of the waveform equalization process; second means for detecting the flag in the signal outputted by the equalizer; and third means for controlling the reproducing of the digital video signal by the first means in response to the flag detected by the second means to maintain a data rate of the digital video signal which is being reproduced by the first means at a constant rate independent of whether the frame frequency of the digital video signal is equal to the first predetermined value or the second predetermined value.

DESCRIPTION OF THE PREFERRED EMBODIMENT

A background-art data recording and reproducing apparatus will be explained hereinafter for a better understanding of this invention.

Figure 1:
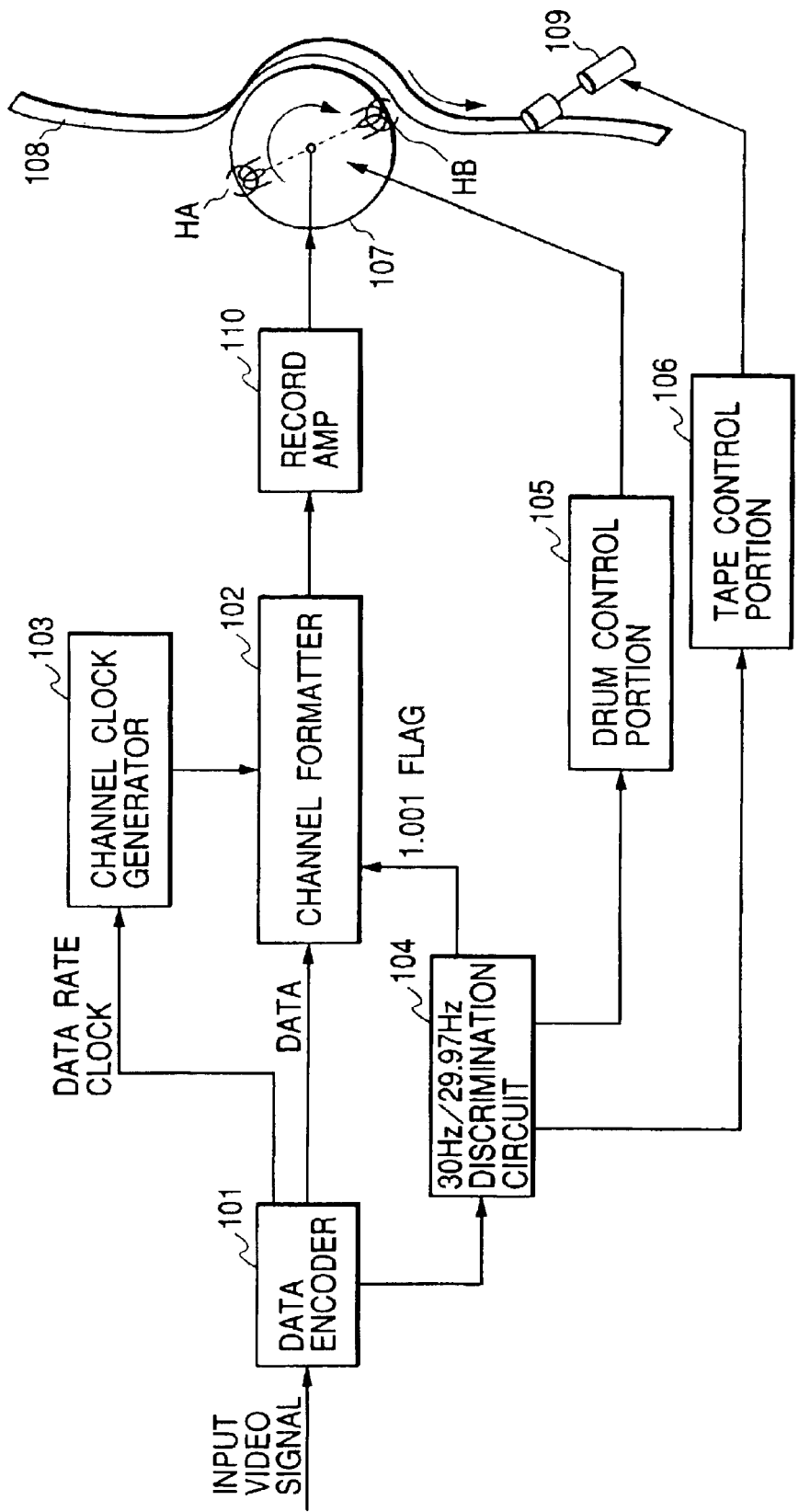
FIG. 1 is a block diagram of a recording side of a background-art data recording and reproducing apparatus.

FIG. 1 shows a recording side of a background-art data recording and reproducing apparatus which is not prior art against this invention. As shown in FIG. 1, the recording side of the background-art apparatus includes a data encoder 101 to which an input video signal is fed. The data encoder 101 subjects the input video signal to a highly-efficient compressively encoding process, thereby converting the input video signal into encoding-resultant digital data. Also, the data encoder 101 generates a data-rate clock signal related to the encoding-resultant digital data. The encoding-resultant digital data are fed from the data encoder 101 to a channel formatter 102. The data-rate clock signal is fed from the data encoder 101 to a channel clock generator 103.

When the input video signal is an NTSC video signal, the frame frequency of the input video signal is equal to 29.97 Hz. When the input video signal results from conversion of a Hi-Vision signal into an NTSC signal, the frame frequency of the input video signal is equal to 30 Hz. The data encoder 101 detects the frame frequency of the input video signal. The data encoder 101 generates a flag representing the detected frame frequency of the input video signal. The frame-frequency flag is fed from the data encoder 101 to a 30-Hz/29.97-Hz discrimination circuit 104.

The 30-Hz/29.97-Hz discrimination circuit 104 decides whether the frame frequency of the input video signal is equal to 30 Hz or 29.97 Hz by referring to the frame-frequency flag fed from the data encoder 101. The 30-Hz/29.97-Hz discrimination circuit 104 generates a 1.001 flag in response to the result of the above-mentioned decision. Specifically, the 1.001 flag is "0" when it is decided that the frame frequency of the input video signal is equal to 30 Hz. The 1.001 flag is "1" when it is decided that the frame frequency of the input video signal is equal to 29.97 Hz. The 30-Hz/29.97-Hz discrimination circuit 104 outputs the 1.001 flag to the channel formatter 102. In addition, the 30-Hz/29.97-Hz discrimination circuit 104 generates a discrimination signal representing the result of the previously-mentioned decision. The 30-Hz/29.97-Hz discrimination circuit 104 outputs the discrimination signal to a drum control portion 105 and a tape control portion 106.

The channel clock generator 103 produces a channel clock signal in response to the data-rate clock signal fed from the data encoder 101. The channel clock generator 103 outputs the channel clock signal to the channel formatter 102.

The channel formatter 102 rearranges (interleaves) the encoding-resultant digital data into a format suited for record on a magnetic tape 108 in synchronism with the channel clock signal. The channel formatter 102 inserts headers, error correction code words (an error correction code signal), and the 1.001 flag into the rearrangement-resultant digital data. The channel formatter 102 outputs a signal representative of the insertion-resultant digital data to a recording amplifier 110 at a data rate (a channel data rate) which depends on the frame frequency of the input video signal.

The drum control portion 105 feeds a drive signal to a motor (not shown) for rotating a rotary drum 107 about its axis. The drum control portion 105 adjusts the drive signal and hence controls the speed of rotation of the drum 107 in response to the discrimination signal outputted from the 30-Hz/29.97-Hz discrimination circuit 104. When the discrimination signal represents that the frame frequency of the input video signal is equal to 30 Hz, the drum control portion 105 operates to rotate the drum 107 at a speed of 30 rps. When the discrimination signal represents that the frame frequency of the input video signal is equal to 29.97 Hz, the drum control portion 105 operates to rotate the drum 107 at a speed of 29.97 rps.

Magnetic heads HA and HB having different azimuth angles are mounted on the circumferential surface of the rotary drum 107. The magnetic heads HA and HB rotate together with the rotary drum 107. The magnetic heads HA and HB are diametrically opposed to each other. In other words, the magnetic heads HA and HB are spaced by an angular interval of 180 degrees. The magnetic tape 108 is wrapped on the circumferential surface of the rotary drum 107 along a part of a helix through an angular range of about 180 degrees.

A tape drive mechanism 109 acts to feed the magnetic tape 108 relative to the rotary drum 107 in a designated direction (a forward direction or a reverse direction). The tape control portion 106 feeds a drive signal to the tape drive mechanism 109. The tape control portion 106 adjusts the drive signal and hence controls the speed of feed of the magnetic tape 108 in response to the discrimination signal outputted from the 30-Hz/29.97-Hz discrimination circuit 104. The tape-speed control is designed so that two slant tracks will be formed on the magnetic tape 108 at a given track pitch per revolution of the rotary drum 107 regardless of whether the discrimination signal represents a frame frequency of 30 Hz or 29.97 Hz.

Figure 2:
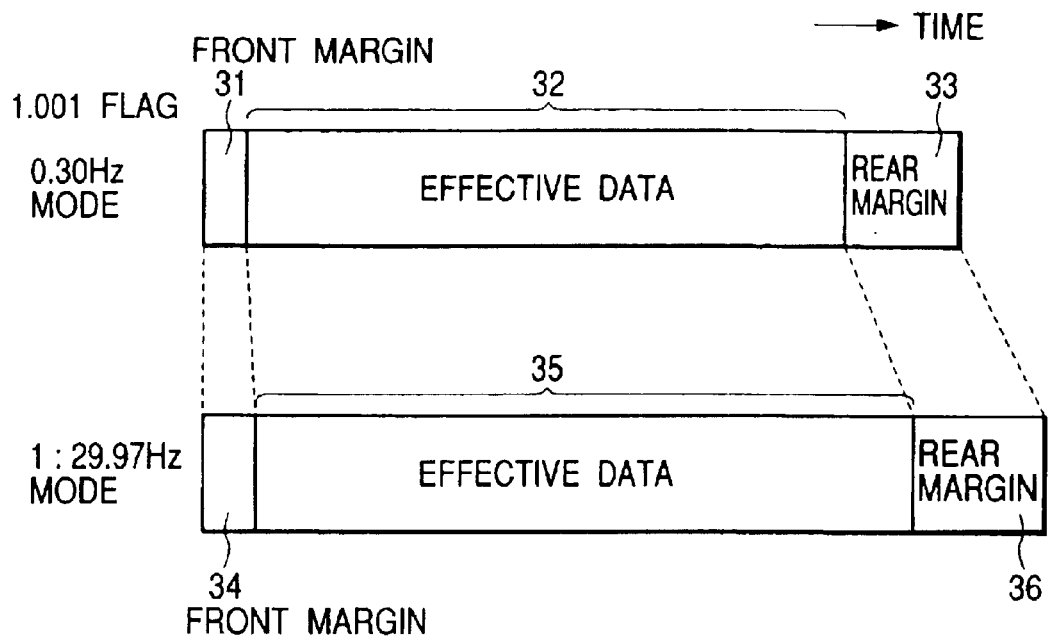
FIG. 2 is a diagram showing the structures of 1-track-corresponding portions of signals each outputted from a channel formatter in FIG. 1.

As shown in FIG. 2, in the case where the 1.001 flag represents that the frame frequency of the input video signal is equal to 30 Hz, a sequence of a front margin 131, effective data 132, and a rear margin 133 is outputted from the channel formatter 102 for every track. In the case where the 1.001 flag represents that the frame frequency of the input video signal is equal to 29.97 Hz, a sequence of a front margin 134, effective data 135, and a rear margin 136 is outputted from the channel formatter 102 for every track. As shown in FIG. 2, the sequence of the front margin 134, the effective data 135, and the rear margin 136 is slightly longer in time length than the sequence of the front margin 131, the effective data 132, and the rear margin 133.

The effective data 132 include a sequence of data blocks each composed of a header, encoding-resultant digital data, an error correction code signal (error correction code words), and other information pieces. The 1.001 flag is contained in the header. The effective data 132 further include auxiliary information such as a subcode signal. The structure of the effective data 135 are similar to that of the effective data 132. The effective data 132 and the effective data 135 are equal to each other in data amount (total number of bits). The front margins 131 and 134 are used in PLL locking processes during reproduction (playback). The front margins 131 and 134 are equal to each other in data amount (total number of bits). The rear margins 133 and 136 are dummy signals provided in consideration of a fluctuation in rotation of the rotary drum 107 and an error in head switching to prevent data interruptions during reproduction (playback). The rear margins 133 and 136 are equal to each other in data amount (total number of bits).

In FIG. 1, the output signal from the channel formatter 102, that is, the digital-data-representing signal, is amplified by the recording amplifier 110. The amplification-resultant signal is transmitted from the recording amplifier 110 to the magnetic heads HA and HB via rotary transformers (not shown). The magnetic heads HA and HB alternately record the amplification-resultant signal on the magnetic tape 108 while sequentially forming slant tracks thereon. Specifically, during the first half of every revolution of the rotary drum 107, one of the magnetic heads HA and HB records the amplification-resultant signal on the magnetic tape 108 while forming a first track thereon. The first track is slant with respect to the magnetic tape 108. During the second half of every revolution, the other magnetic head records the amplification-resultant signal on the magnetic tape 108 while forming a second track thereon. The second track is parallel with the first track.

Figure 3:
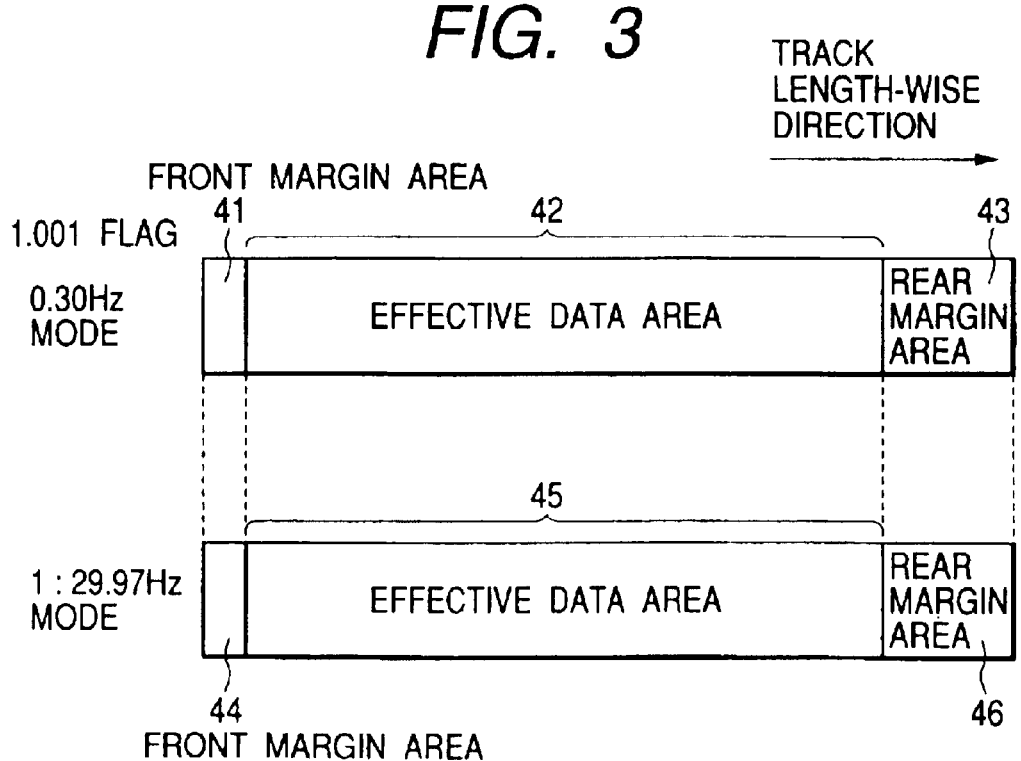
FIG. 3 is a diagram of the structures of tracks on a magnetic tape in FIG. 1.

As shown in FIG. 3, in the case where the 1.001 flag represents that the frame frequency of the input video signal is equal to 30 Hz, every track formed on the magnetic tape 108 has a sequence of a front margin area 141, an effective data area 142, and a rear margin area 143. The front margin 131, the effective data 132, and the rear margin 133 in FIG. 2 are assigned to the areas 141, 142, and 143, respectively. In the case where the 1.001 flag represents that the frame frequency of the input video signal is equal to 29.97 Hz, every track formed on the magnetic tape 108 has a sequence of a front margin area 144, an effective data area 145, and a rear margin area 146. The front margin 134, the effective data 135, and the rear margin 136 in FIG. 2 are assigned to the areas 144, 145, and 146, respectively.

The arrangement and the density of data recorded on a track are constant independent of whether the frame frequency of the input video signal is equal to 30 Hz or 29.97 Hz. Therefore, as shown in FIG. 3, the length of every track formed on the magnetic tape 108 for the input video signal having a frame frequency of 30 Hz is equal to that for the input video signal having a frame frequency of 29.97 Hz.

The speed of rotation of the rotary drum 107 for the input video signal having a frame frequency of 30 Hz differs from that for the input video signal having a frame frequency of 29.97 Hz by 0.1%. Accordingly, the rate of data reproduction from the magnetic tape 108 for recorded data related to a frame frequency of 30 Hz differs from that for recorded data related to a frame frequency of 29.97 Hz by 0.1%. It should be noted that the front margins 131 and 134 (see FIG. 2) are equal to each other in data amount. In addition, the effective data 132 and the effective data 135 (see FIG. 2) are equal to each other in data amount. Furthermore, the rear margins 133 and 136 (see FIG. 2) are equal to each other in data amount.

Figure 4:
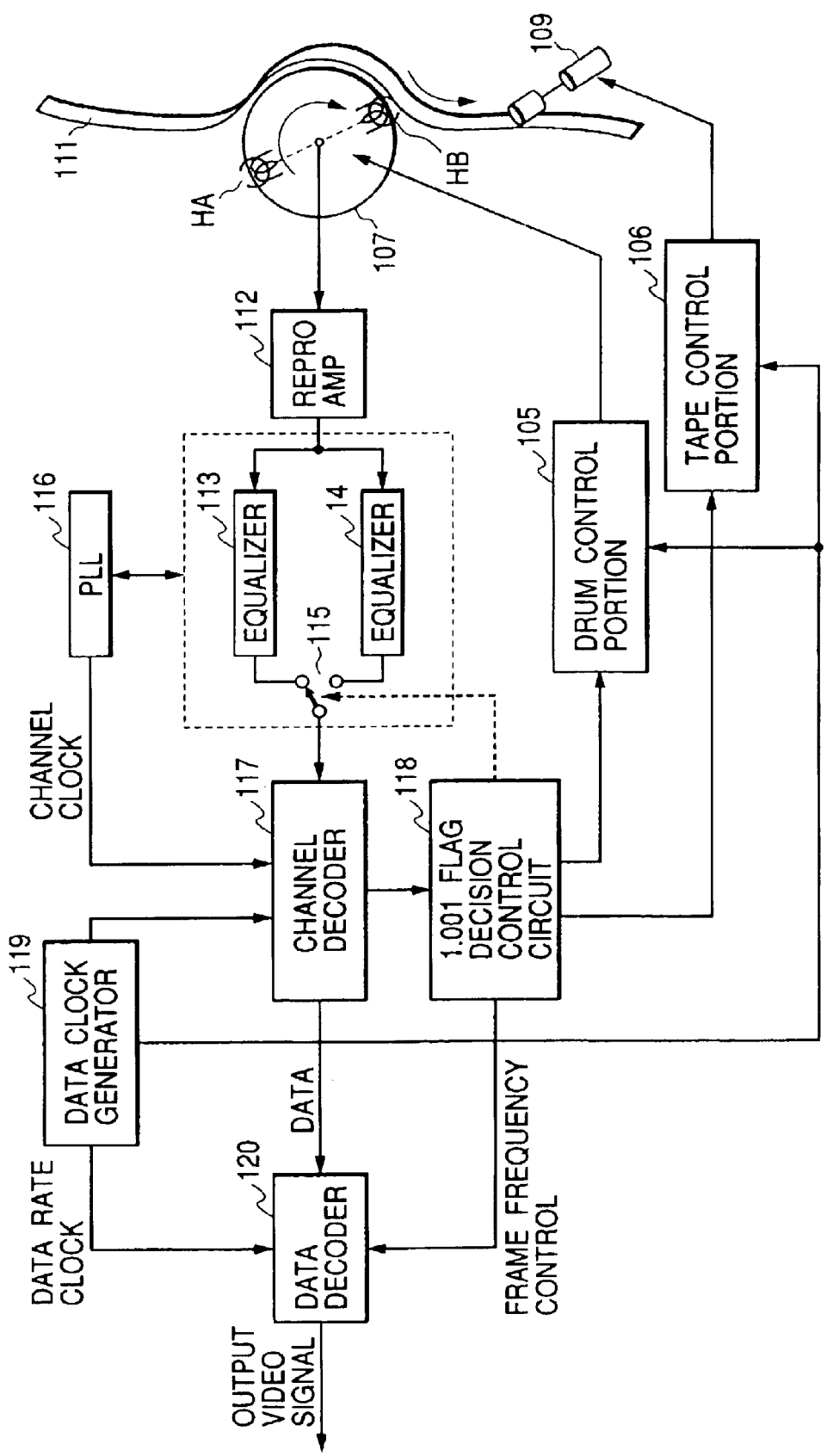
FIG. 4 is a block diagram of a reproducing side of the background-art data recording and reproducing apparatus.

FIG. 4 shows a reproducing side of the background-art data recording and reproducing apparatus. As shown in FIG. 4, the reproducing side of the background-art apparatus includes a reproducing amplifier 112. During a playback mode of operation of the background-art apparatus, the magnetic heads HA and HB alternately reproduce a digital-data-representing signal from a magnetic tape 111. The reproduced signal is transmitted from the magnetic heads HA and HB to the reproducing amplifier 112 via the rotary transformers (not shown). The reproduced signal is amplified by the reproducing amplifier 112. The amplification-resultant signal is outputted from the reproducing amplifier 112 to equalizers 113 and 114.

The equalizer 113 has first predetermined equalization characteristics suited for a reproduced signal having a data rate related to a frame frequency of 30 Hz. Specifically, the first predetermined equalization characteristics are tuned to a data rate at which a signal related to a frame frequency of 30 Hz is reproduced from the magnetic tape 111. On the other hand, the equalizer 114 has second predetermined equalization characteristics suited for a reproduced signal having a data rate related to a frame frequency of 29.97 Hz. Specifically, the second predetermined equalization characteristics are tuned to a data rate at which a signal related to a frame frequency of 29.97 Hz is reproduced from the magnetic tape 111. The equalizer 113 subjects the output signal of the reproducing amplifier 112 to a waveform equalization process accorded with the first predetermined equalization characteristics. The equalizer 113 outputs the equalization-resultant signal to a switch 115. The equalizer 114 subjects the output signal of the reproducing amplifier 112 to a waveform equalization process accorded with the second predetermined equalization characteristics. The equalizer 114 outputs the equalization-resultant signal to the switch 115.

The switch 115 selects one of the output signals from the equalizers 113 and 114, and transmits the selected signal to a channel decoder 117 and a PLL (phase-locked loop) circuit 116. The PLL circuit 116 responds to selected one of the output signals from the equalizers 113 and 114, thereby generating a channel clock signal having a frequency corresponding to the bit rate of the reproduced signal. The PLL circuit 116 feeds the channel clock signal to the channel decoder 117.

The channel decoder 117 has the function of recovering a 1.001 flag from the signal transmitted via the switch 115. The playback mode of operation of the background-art apparatus can be changed between a plurality of types including a first type suited for a recorded signal related to a frame frequency of 30 Hz and a second type suited for a recorded signal related to a frame frequency of 29.97 Hz. The playback mode of operation of the background-art apparatus starts from preset one of the first and second types. The preset type is designed to enable the channel decoder 117 to recover the 1.001 flag from the signal transmitted via the switch 115 at the start of playback even in the case where the preset type is not suited for an actual recorded signal. The channel decoder 117 outputs the recovered 1.001 flag to a 1.001 flag decision control circuit 118.

The 1.001 flag decision control circuit 118 detects the state of the 1.001 flag, and hence decides whether the reproduced signal relates to a frame frequency of 30 Hz or 29.97 Hz. When the 1.001 flag represents that the reproduced signal relates to a frame frequency of 30 Hz, the 1.001 flag decision control circuit 118 controls the switch 115 to select the output signal from the equalizer 113. In addition, the 1.001 flag decision control circuit 118 controls the drum control portion 105 to rotate the drum 107 at a speed of 30 rps. Furthermore, the 1.001 flag decision control circuit 118 controls the tape control portion 106 to feed the magnetic tape 111 at a speed matching a recorded signal having a frame frequency of 30 Hz. On the other hand, when the 1.001 flag represents that the reproduced signal relates to a frame frequency of 29.97 Hz, the 1.001 flag decision control circuit 118 controls the switch 115 to select the output signal from the equalizer 114. In addition, the 1.001 flag decision control circuit 118 controls the drum control portion 105 to rotate the drum 107 at a speed of 29.97 rps. Furthermore, the 1.001 flag decision control circuit 118 controls the tape control portion 106 to feed the magnetic tape 111 at a speed matching a recorded signal having a frame frequency of 29.97 Hz.

The 1.001 flag decision control circuit 118 generates a frame-frequency control signal in response to the state of the 1.001 flag. The 1.001 flag decision control circuit 118 outputs the frame-frequency control signal to a data decoder 120.

The channel decoder 117 responds to the channel clock signal from the PLL circuit 116 and a data clock signal from a data clock generator. 119, recovering first data from the signal transmitted via the switch 115 and correcting the first data into second data in response to an error correction code signal therein before de-interleaving the second data into third data. The channel decoder 117 outputs the third data to the data decoder 120.

The data decoder 120 decodes the output data from the channel decoder 117 into an original video signal in response to the data clock signal from the data clock generator 119 and the frame-frequency control signal from the 1.001 flag decision control circuit 118. The decoding-resultant original video signal is also referred to as the reproduced video signal. The data decoder 120 outputs the reproduced video signal.

The data clock generator 119 feeds the data clock signal to the drum control portion 105 and the tape control portion 106. The data clock signal is used in operation of the drum control portion 105 and the tape control portion 106.

Since the background-art apparatus in FIGS. 1 and 4 has two equalizers (the equalizers 113 and 114), the structure of the background-art apparatus is complicated. In addition, the background-art apparatus is expensive.

In the background-art apparatus of FIGS. 1 and 4, the PLL circuit 116 has a variable-frequency range (a frequency locking range) wide enough to follow both a signal having a data rate related to a frame frequency of 30 Hz and a signal having a data rate related to a frame frequency of 29.97 Hz. The wide variable-frequency range tends to cause jitter or noise.

Embodiment

Figure 5:
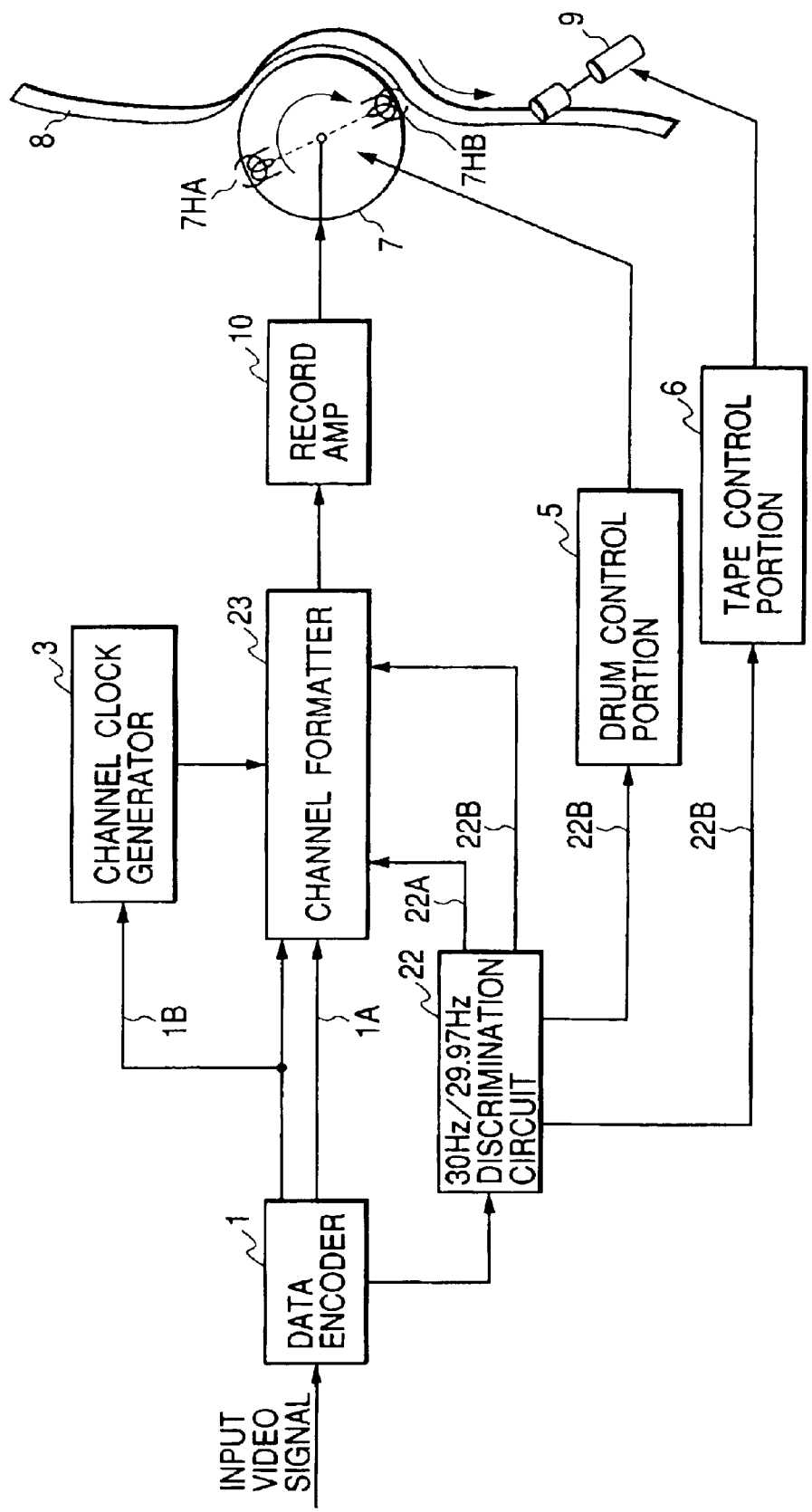
FIG. 5 is a block diagram of a recording side of a data recording and reproducing apparatus according to an embodiment of this invention.

FIG. 5 shows a recording side of a data recording and reproducing apparatus according to an embodiment of this invention. As shown in FIG. 5, the recording side of the apparatus includes a data encoder 1 to which an input video signal is fed. Preferably, the data encoder 1 is an MPEG encoder. The data encoder 1 subjects the input video signal to a highly-efficient compressively encoding process, thereby converting the input video signal into encoding-resultant digital data 1A having a fixed data rate independent of the frame frequency of the input video signal. Also, the data encoder 1 generates a data-rate clock signal 1B related to the encoding-resultant digital data 1A. The encoding-resultant digital data 1A are fed from the data encoder 1 to a channel formatter 23. The data-rate clock signal 1B is fed from the data encoder 1 to a channel clock generator 3 and a channel formatter 23.

When the input video signal is an NTSC video signal, the frame frequency of the input video signal is equal to 29.97 Hz. When the input video signal results from conversion of a Hi-Vision signal into an NTSC signal, the frame frequency of the input video signal is equal to 30 Hz. The data encoder 1 detects the frame frequency of the input video signal. The data encoder 1 generates a flag 1C representing the detected frame frequency of the input video signal. The frame-frequency flag 1C is fed from the data encoder 1 to a 30-Hz/29.97-Hz discrimination circuit 22.

The 30-Hz/29.97-Hz discrimination circuit 22 decides whether the frame frequency of the input video signal is equal to 30 Hz or 29.97 Hz by referring to the frame-frequency flag 1C fed from the data encoder 1. The 30-Hz/29.97-Hz discrimination circuit 22 generates a 1.001 flag 22A in response to the result of the above-mentioned decision. Specifically, the 1.001 flag 22A is "0" when it is decided that the frame frequency of the input video signal is equal to 30 Hz. The 1.001 flag 22A is "1" when it is decided that the frame frequency of the input video signal is equal to 29.97 Hz. The 30-Hz/29.97-Hz discrimination circuit 22 outputs the 1.001 flag 22A to the channel formatter 23. In addition, the 30-Hz/29.97-Hz discrimination circuit 22 generates a discrimination signal 22B representing the result of the previously-mentioned decision. The 30-Hz/29.97-Hz discrimination circuit 22 outputs the discrimination signal 22B to the channel formatter 23, a drum control portion 5, and a tape control portion 6.

The channel clock generator 3 produces a channel clock signal in response to the data-rate clock signal 1B fed from the data encoder 1. The channel clock signal has a fixed frequency independent of the frame frequency of the input video signal. The channel clock generator 3 outputs the channel clock signal to the channel formatter 23.

The channel formatter 23 rearranges (interleaves) the encoding-resultant digital data 1A into a format suited for record on a magnetic tape 8 in synchronism with the channel clock signal. The channel formatter 2 inserts headers, error correction code words (an error correction code signal), and the 1.001 flag 22A into the rearrangement-resultant digital data. The channel formatter 23 outputs a signal representative of the insertion-resultant data to a recording amplifier 10 at a given data rate (a given channel data rate) independent of the frame frequency of the input video signal.

The drum control portion 5 feeds a drive signal to a motor (not shown) for rotating a rotary drum 7 about its axis. The drum control portion 5 adjusts the drive signal and hence controls the speed of rotation of the drum 7 in response to the discrimination signal 22B outputted from the 30-Hz/29.97-Hz discrimination circuit 22. When the discrimination signal 22B represents that the frame frequency of the input video signal is equal to 30 Hz, the drum control portion 5 operates to rotate the drum 7 at a speed of 30 rps. When the discrimination signal 22B represents that the frame frequency of the input video signal is equal to 29.97 Hz, the drum control portion 5 operates to rotate the drum 7 at a speed of 29.97 rps.

Magnetic heads 7HA and 7HB having different azimuth angles are mounted on the circumferential surface of the rotary drum 7. The magnetic heads 7HA and 7HB rotate together with the rotary drum 7. The magnetic heads 7HA and 7HB are diametrically opposed to each other. In other words, the magnetic heads 7HA and 7HB are spaced by an angular interval of 180 degrees. The magnetic tape 8 is wrapped on the circumferential surface of the rotary drum 7 along a part of a helix through an angular range of about 180 degrees.

A tape drive mechanism 9 acts to feed the magnetic tape 8 relative to the rotary drum 7 in an ordered direction (a forward direction or a reverse direction). The tape control portion 6 feeds a drive signal to the tape drive mechanism 9.

The tape control portion 6 adjusts the drive signal and hence controls the speed of feed of the magnetic tape 8 in response to the discrimination signal 22B outputted from the 30-Hz/29.97-Hz discrimination circuit 22. The tape-speed control is designed so that two slant tracks will be formed on the magnetic tape 8 at a given track pitch per revolution of the rotary drum 7 regardless of whether the discrimination signal 22B represents a frame frequency of 30 Hz or 29.97 Hz.

Figure 6:
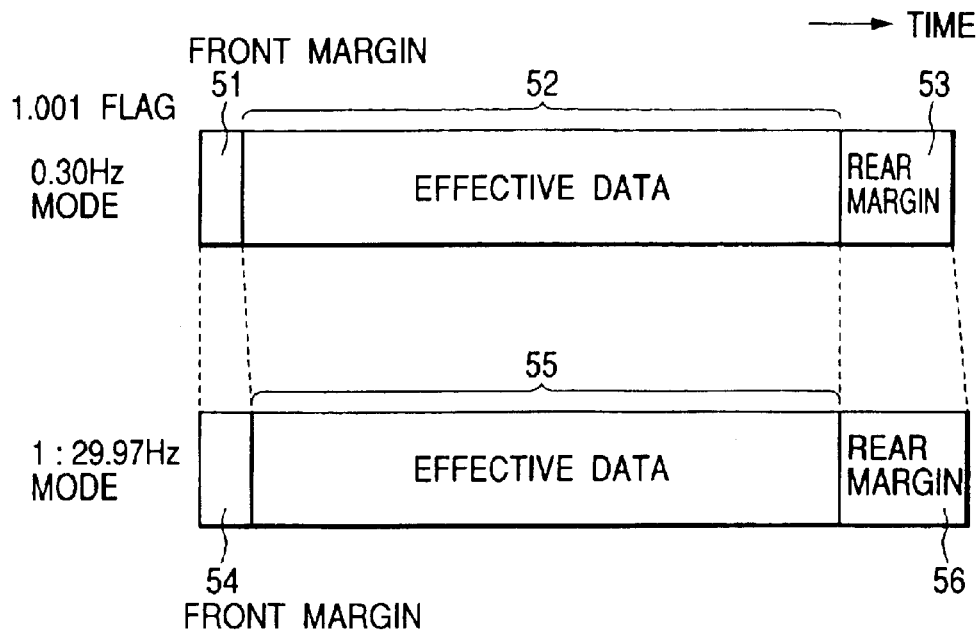
FIG. 6 is a diagram showing the structures of 1-track-corresponding portions of signals each outputted from a channel formatter in FIG. 5.

As shown in FIG. 6, in the case where the 1.001 flag 22A represents that the frame frequency of the input video signal is equal to 30 Hz, a sequence of a front margin 51, effective data 52, and a rear margin 53 is outputted from the channel formatter 23 for every track. In the case where the 1.001 flag 22A represents that the frame frequency of the input video signal is equal to 29.97 Hz, a sequence of a front margin 54, effective data 55, and a rear margin 56 is outputted from the channel formatter 23 for every track. As shown in FIG. 6, the sequence of the front margin 54, the effective data 55, and the rear margin 56 is slightly longer in time length than the sequence of the front margin 51, the effective data 52, and the rear margin 53.

The effective data 52 include a sequence of data blocks each composed of a header, encoding-resultant digital data, an error correction code signal (error correction code words), and other information pieces. The 1.001 flag 22A is contained in the header. The effective data 52 further include auxiliary information such as a subcode signal. The structure of the effective data 55 are similar to that of the effective data 52. The effective data 52 and the effective data 55 are equal to each other in data amount (total number of bits). The front margins 51 and 54 are used in PLL locking processes during reproduction (playback). The front margins 51 and 54 are equal to each other in data amount (total number of bits). The rear margins 53 and 56 are dummy signals provided in consideration of a fluctuation in rotation of the rotary drum 7 and an error in head switching to prevent data interruptions during reproduction (playback). The rear margin 56 is greater than the rear margin 53 in data amount (total number of bits) by a predetermined value.

In FIG. 5, the output signal from the channel formatter 23, that is, the digital-data-representing signal, is amplified by the recording amplifier 10. The amplification-resultant signal is transmitted from the recording amplifier 10 to the magnetic heads 7HA and 7HB via rotary transformers (not shown). The magnetic heads 7HA and 7HB alternately record the amplification-resultant signal on the magnetic tape 8 while sequentially forming slant tracks thereon. Specifically, during the first half of every revolution of the rotary drum 7, one of the magnetic heads 7HA and 7HB records the amplification-resultant signal on the magnetic tape 8 while forming a first track thereon. The first track is slant with respect to the magnetic tape 8. During the second half of every revolution, the other magnetic head records the amplification-resultant signal on the magnetic tape 8 while forming a second track thereon. The second track is parallel with the first track.

Figure 7:
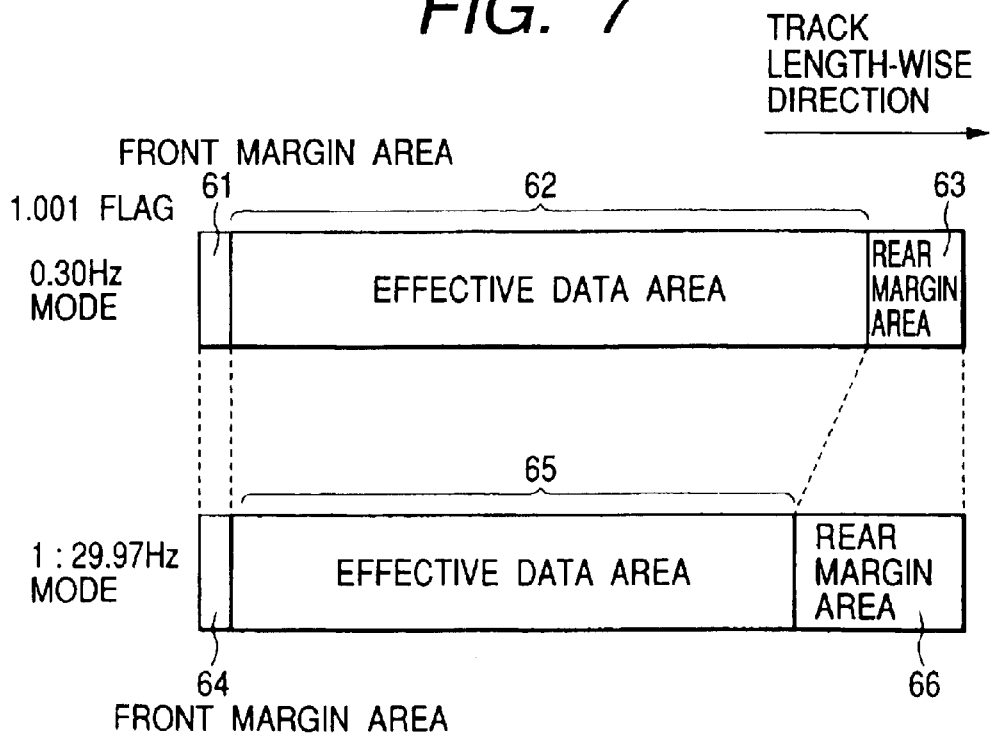
FIG. 7 is a diagram of the structures of tracks on a magnetic tape in FIG. 5.

As shown in FIG. 7, in the case where the 1.001 flag 22A represents that the frame frequency of the input video signal is equal to 30 Hz, every track formed on the magnetic tape 8 has a sequence of a front margin area 61, an effective data area 62, and a rear margin area 63. The front margin 51, the effective data 52, and the rear margin 53 in FIG. 6 are assigned to the areas 61, 62, and 63, respectively. In the case where the 1.001 flag 22A represents that the frame frequency of the input video signal is equal to 29.97 Hz, every track formed on the magnetic tape 8 has a sequence of a front margin area 64, an effective data area 65, and a rear margin area 66. The front margin 54, the effective data 55, and the rear margin 56 in FIG. 6 are assigned to the areas 64, 65, and 66, respectively.

As previously mentioned, the channel data rate (the data rate of the output signal from the channel formatter 23) is constant independently of the frame frequency of the input video signal. On the other hand, the speed of the scanning of the magnetic tape 8 by the magnetic heads 7HA and 7HB increases as the frame frequency of the input video signal changes from 29.97 Hz to 30 Hz. Accordingly, the density of data recorded on the magnetic tape 8 increases by 0.1% as the frame frequency of the input video signal changes from 30 Hz to 29.97 Hz. The data amount of the rear margin 56 is greater than the data amount of the rear margin 53 by a predetermined value which is chosen to make the length of every track constant regardless of whether the frame frequency of the input video signal is equal to 30 Hz or 29.97 Hz. Therefore, as shown in FIG. 7, the length of every track formed on the magnetic tape 8 for the input video signal having a frame frequency of 30 Hz is equal to that for the input video signal having a frame frequency of 29.97 Hz.

Figure 8:
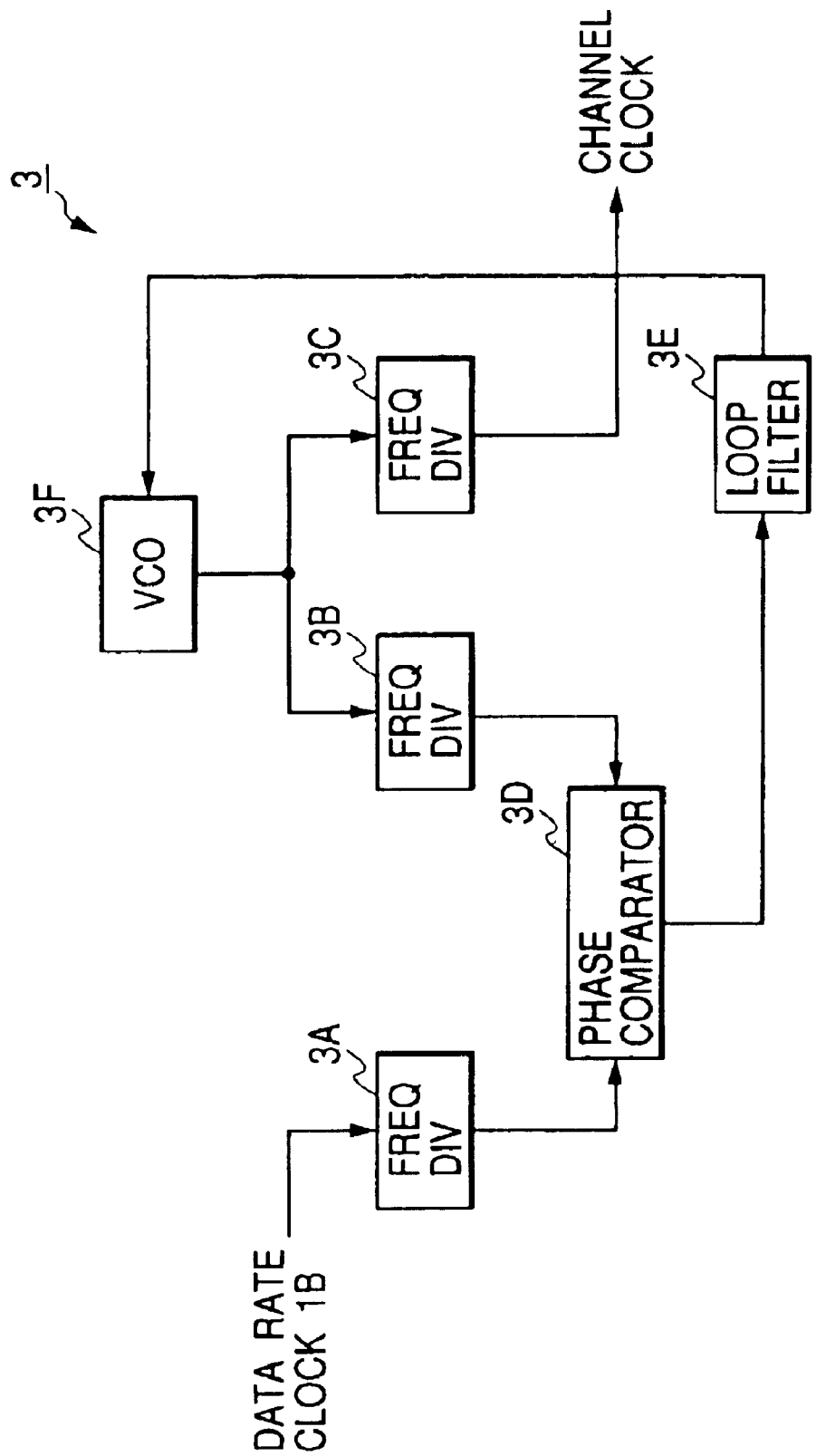
FIG. 8 is a block diagram of a channel clock generator in FIG. 5.

FIG. 8 shows the structure of the channel clock generator 3. The channel clock generator 3 is formed by a PLL (phase-locked loop) circuit. As shown in FIG. 8, the channel clock generator 3 includes frequency dividers 3A, 3B, and 3C, a phase comparator 3D, a loop filter 3E, and a voltage-controlled oscillator (VCO) 3F.

The frequency divider 3A receives the data-rate clock signal 1B from the data encoder 1 (see FIG. 5). The device 3A divides the frequency of the data-rate clock signal 1B by a predetermined value. The frequency divider 3A outputs the frequency-division-resultant signal to the phase comparator 3D. The device 3D compares the phase of the output signal of the frequency divider 3A and an output signal of the frequency divider 3B. The phase comparator 3D outputs the phase-comparison-resultant signal to the loop filter 3E. The loop filter 3E removes high-frequency components from the output signal of the phase comparator 3D. The loop filter 3E outputs the filtering-resultant signal to the VCO 3F as a control signal. The VCO 3F oscillates at a frequency depending on the output signal of the loop filter 3E. The VCO 3F outputs the oscillation signal to the frequency dividers 3B and 3C. The device 3B divides the frequency of the output signal of the VCO 3F by a predetermined value. The frequency divider 3B outputs the frequency-division-resultant signal to the phase comparator 3D. The device 3C divides the frequency of the output signal of the VCO 3F by a predetermined value. The frequency divider 3C outputs the frequency-division-resultant signal to the channel formatter 23 (see FIG. 5) as the channel clock signal.

Figure 9:
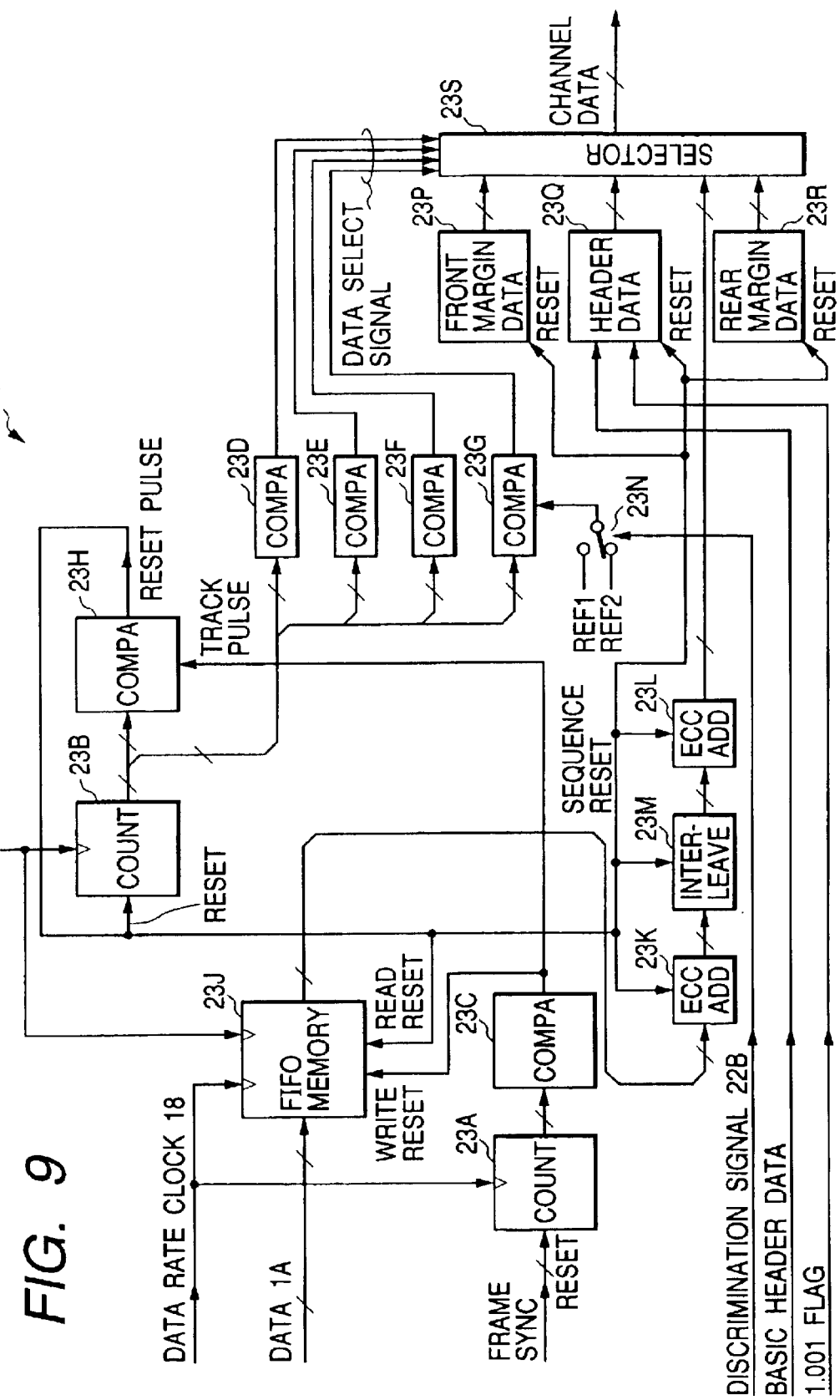
FIG. 9 is a block diagram of the channel formatter in FIG. 5.

FIG. 9 shows the structure of the channel formatter 23. As shown in FIG. 9, the channel formatter 23 includes counters 23A and 23B, comparators 23C, 23D, 23E, 23F, and 23G, a window comparator 23H, a fast-in fast-out (FIFO) memory 23J, ECC adders 23K and 23L, an interleaving circuit 23M, a switch 23N, a front margin data generator 23P, a header data generator 23Q, a rear margin data generator 23R, and a selector 23S.

The FIFO memory 23J receives the encoding-resultant digital data 1A from the data encoder 1. The FIFO memory 23J responds to the data rate clock signal 1B, the channel clock signal, a write reset signal, and a read reset signal. The encoding-resultant digital data 1A are written into the FIFO memory 23J before being read out and outputted therefrom. The encoding-resultant digital data outputted from the FIFO memory 23J are fed to the ECC adder 23K.

The device 23A operates as a data counter. The device 23A counts pulses of the data rate clock signal 1B. The counter 23A outputs a signal representative of the number of counted pulses to the comparator 23C. The counter 23A is reset by every pulse of a frame sync signal generated by a suitable device (not shown). The device 23C compares the counted-pulse number represented by the output signal of the counter 23A with a reference number for determining the amount of data recorded on one track. The comparator 23C generates a signal representative of the result of the comparison. The comparator 23C outputs the comparison-result signal to the FIFO memory 23J as the write reset signal. The comparator 23C outputs the comparison-result signal to the window comparator 23H as a track pulse signal.

The ECC adders 23K and 23L, and the interleaving circuit 23M respond to a sequence reset signal. The ECC adder 23K generates a first error correction code signal (an outer code signal) in response to the output data from the FIFO memory 23J. The device 23K adds the first error correction code signal to the output data from the FIFO memory 23J. The ECC adder 23K outputs the addition-resultant data to the interleaving circuit 23M. The interleaving circuit 23M rearranges (interleaves) the output data from the ECC adder 23K. The interleaving circuit 23M outputs the rearrangement-resultant data to the ECC adder 23L. The ECC adder 23L generates a second error correction code signal (an inner code signal) in response to the output data from the interleaving circuit 23M. The device 23L adds the second error correction code signal to the output data from the interleaving circuit 23M. The ECC adder 23L outputs the addition-resultant data to the selector 23S.

The device 23P produces data for the front margin, and outputs the front margin data to the selector 23S. The front margin data generator 23P is reset by every pulse of a reset signal.

The header data generator 23Q receives basic header data from a suitable device (not shown). The header data generator 23Q receives the 1.001 flag 22A from the 30-Hz/29.97-Hz discrimination circuit 22 (see FIG. 5). The header data generator 23Q combines the basic header data and the 1.001 flag 22A into final data for the headers. The header data generator 23Q outputs the final header data to the selector 23S. The header data generator 23Q is reset by every pulse of a reset signal.

The device 23R produces data for the rear margin, and outputs the rear margin data to the selector 23S. The rear margin data generator 23R is reset by every pulse of a reset signal.

The device 23B operates as a channel data counter. The device 23B counts pulses of the channel clock signal. The counter 23B outputs a signal representative of the number of counted pulses to the comparators 23D, 23E, 23F, 23G, and the window comparator 23H. The counter 23B is reset by every pulse of a reset signal.

The comparator 23D relates to the front margin. The device 23D compares the counted-pulse number represented by the output signal of the counter 23B with a predetermined reference number for determining the timing of the end of the front margin. The comparator 23D generates a signal representative of the result of the comparison. The comparator 23D outputs the comparison-result signal to the selector 23S.

The comparator 23E relates to the headers. The device 23E compares the counted-pulse number represented by the output signal of the counter 23B with predetermined reference numbers for determining the timings of the ends of the headers. The comparator 23E generates a signal representative of the result of the comparison. The comparator 23E outputs the comparison-result signal to the selector 23S.

For example, the comparator 23E includes sub-comparators which compare the counted-pulse number represented by the output signal of the counter 23B with the predetermined reference numbers for determining the timings of the ends of the headers, respectively. The sub-comparators output the comparison-result signals which are combined by an OR circuit into a binary signal fed to the selector 23S.

The comparator 23F relates to the data regions except the headers, the front margin, and the rear margin. The device 23F compares the counted-pulse number represented by the output signal of the counter 23B with predetermined reference numbers for determining the timings of the ends of the data regions. The comparator 23F generates a signal representative of the result of the comparison. The comparator 23F outputs the comparison-result signal to the selector 23S.

For example, the comparator 23F includes sub-comparators which compare the counted-pulse number represented by the output signal of the counter 23B with the predetermined reference numbers for determining the timings of the ends of the data regions, respectively. The sub-comparators output the comparison-result signals which are combined by an OR circuit into a binary signal fed to the selector 23S.

The comparator 23G relates to the rear margin. The device 23G compares the counted-pulse number represented by the output signal of the counter 23B with a reference number for determining the timing of the end of the rear margin. The comparator 23G generates a signal representative of the result of the comparison. The comparator 23G outputs the comparison-result signal to the selector 23S. The switch 23N receives the discrimination signal 22B from the 30-Hz/29.97-Hz discrimination circuit 22 (see FIG. 5). The switch 23N receives a first reference signal from a suitable device (not shown) which represents a first predetermined number. In addition, the switch 23N receives a second reference signal from a suitable device (not shown) which represents a second predetermined number greater than the first predetermined number. The switch 23N selects one of the first reference signal and the second reference signal in response to the discrimination signal 22B. Specifically, when the discrimination signal 22B represents that the frame frequency of the input video signal is equal to 30 Hz, the switch 23N selects the first reference signal. When the discrimination signal 22B represents that the frame frequency of the input video signal is equal to 29.97 Hz, the switch 23N selects the second reference signal. The switch 23N outputs the selected reference signal to the comparator 23G.

The comparator 23G uses the output signal from the switch 23N as an indication of the reference number. When the discrimination signal 22B represents that the frame frequency of the input video signal is equal to 30 Hz, the first reference signal is fed to the comparator 23G via the switch 23N so that the first predetermined number indicated by the first reference signal is used by the comparator 23G as the reference number. Thus, in this case, the comparator 23G provides a relatively earlier timing of the end of the rear margin since the first predetermined number is smaller than the second predetermined number. When the discrimination signal 22B represents that the frame frequency of the input video signal is equal to 29.97 Hz, the second reference signal is fed to the comparator 23G via the switch 23N so that the second predetermined number indicated by the second reference signal is used by the comparator 23G as the reference number. Thus, in this case, the comparator 23G provides a relatively late timing of the end of the rear margin since the second predetermined number is greater than the first predetermined number.

The signals outputted from the comparators 23D, 23E, 23F, and 23G to the selector 23S compose a data selection control signal. The device 23S sequentially and cyclically selects one of the output data from the front margin data generator 23P, the output data from the header data generator 23Q, the output data from the ECC adder 23L, and the output data from the rear margin data generator 23R in response to the data selection control signal. The selector 23S feeds the selected data to the recording amplifier 10 (see FIG. 5).

The output data from the rear margin data generator 23R are continuously selected by the device 23S during the time interval whose ending point is determined by the output signal from the comparator 23G, and whose starting point is determined by the output signal from the comparator 23F. The ending point of this time interval is changed in response to the discrimination signal 22B applied to the switch 23N.

The device 23H compares the counted-pulse number represented by the output signal of the counter 23B with a reference number. The window comparator 23H is controlled by the track pulse signal so that the comparison by the device 23H will undergo a window process for preventing the occurrence of jitter. The window comparator 23H generates a signal representative of the result of the comparison. The window comparator 23H outputs the comparison-result signal to the FIFO memory 23J as the read reset signal. The window comparator 23H outputs the comparison-result signal to the counter 23B, the front margin data generator 23P, the header data generator 23Q, and the rear margin data generator 23R as the reset signal. The window comparator 23H outputs the comparison-result signal to the ECC adders 23K and 23L, and the interleaving circuit 23M as the sequence reset signal.

Figure 10:
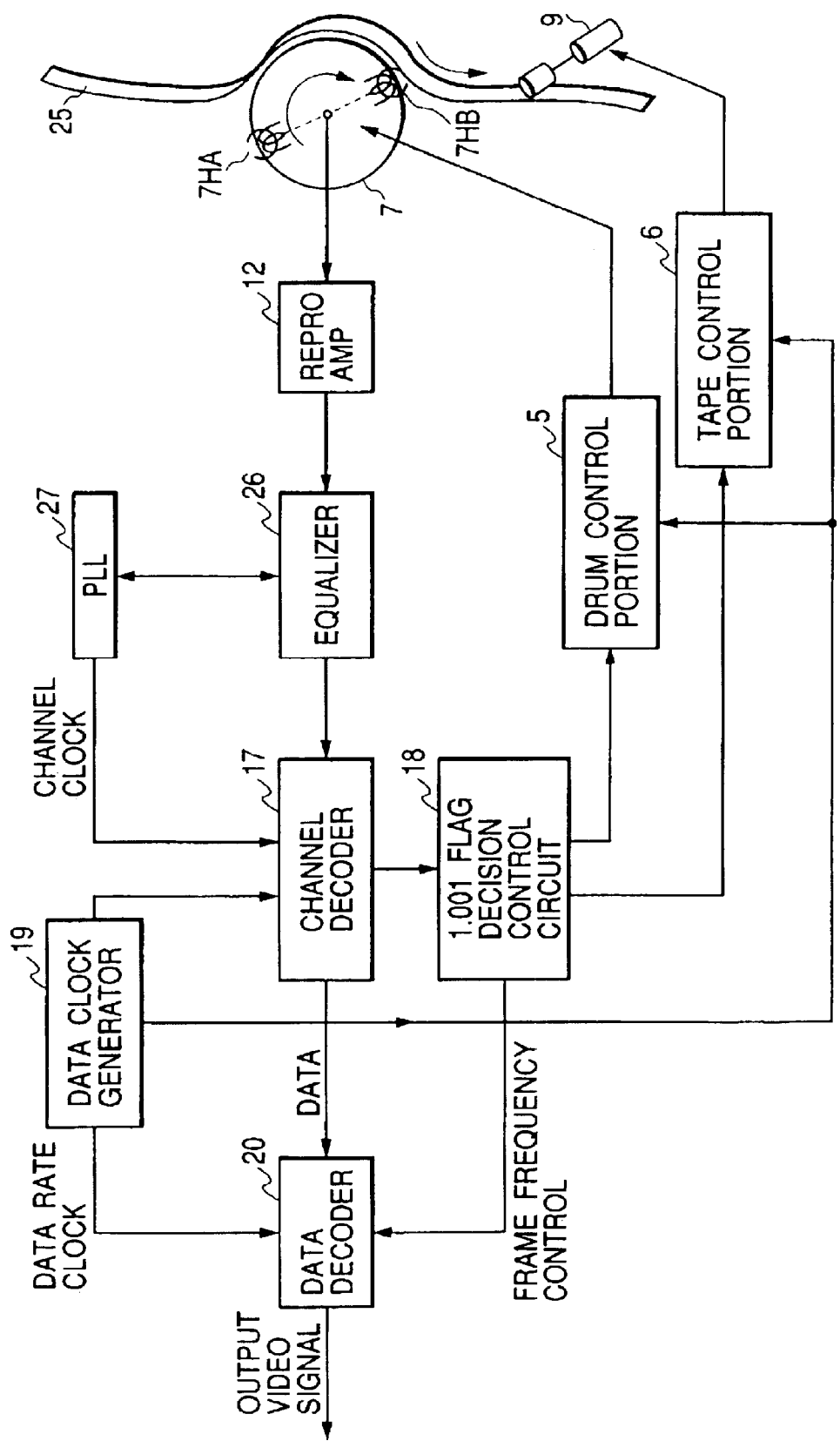
FIG. 10 is a block diagram of a reproducing side of the data recording and reproducing apparatus according to the embodiment of this invention.

FIG. 10 shows a reproducing side of the data recording and reproducing apparatus according to the embodiment of this invention. As shown in FIG. 10, the reproducing side of the apparatus includes a reproducing amplifier 12. During a playback mode of operation of the apparatus, the magnetic heads 7HA and 7HB alternately reproduce a digital-data-representing signal from a magnetic tape 25 at a given data rate (a given channel data rate) independent of the frame frequency to which the digital-data-representing signal is related. The reproduced signal is transmitted from the magnetic heads 7HA and 7HB to the reproducing amplifier 12 via the rotary transformers (not shown). The reproduced signal is amplified by the reproducing amplifier 12. The amplification-resultant signal is outputted from the reproducing amplifier 12 to an equalizer 26.

The equalizer 26 has predetermined equalization characteristics suited for a reproduced signal related to the previously-indicated given data rate (given channel data rate). The equalizer 26 subjects the output signal of the reproducing amplifier 12 to a waveform equalization process accorded with the predetermined equalization characteristics. A single equalizer, that is, the equalizer 26, is used in both the case where the reproduced signal relates to a frame frequency of 30 Hz and the case where the reproduced signal relates to a frame frequency of 29.97 Hz. The equalizer 26 outputs the equalization-resultant signal to a channel decoder 17 and a PLL (phase-locked loop) circuit 27.

The PLL circuit 27 responds to the output signal from the equalizer 26, thereby generating a channel clock signal having a frequency corresponding to the previously-indicated given data rate (given channel data rate). The PLL circuit 27 feeds the channel clock signal to the channel decoder 17. Since the previously-indicated given data rate is constant independently of whether the reproduced signal relates to a frame frequency of 30 Hz or 29.97 Hz, the PLL circuit 116 is preferably designed to have a narrow variable-frequency range (a narrow frequency locking range). The narrow variable-frequency range is advantageous in suppressing and preventing jitter or noise.

The channel decoder 17 has the function of recovering a 1.001 flag from the output signal of the equalizer 26. The playback mode of operation of the apparatus can be changed between a plurality of types including a first type suited for a recorded signal related to a frame frequency of 30 Hz and a second type suited for a recorded signal related to a frame frequency of 29.97 Hz. The playback mode of operation of the apparatus starts from preset one of the first and second types. The preset type is designed to enable the channel decoder 17 to recover the 1.001 flag from the output signal of the equalizer 26 at the start of playback even in the case where the preset type is not suited for an actual recorded signal. The channel decoder 17 outputs the recovered 1.001 flag to a 1.001 flag decision control circuit 18.

According to an example, the channel decoder 17 periodically recovers a 1.001 flag from the output signal of the equalizer 26. In the case where the recovered 1.001 flags are different in contents, the actual 1.001-flag state is estimated on a decision-by-majority basis.

During the start of playback, the mode of operation of the apparatus may be changed between the first type and the second type. In this case, the actual 1.001-flag state can be detected when the apparatus operates in the mode of one of the first and second types which matches a frame frequency concerning the recorded signal.

The 1.001 flag decision control circuit 18 detects the state of the 1.001 flag, and hence decides whether the reproduced signal relates to a frame frequency of 30 Hz or 29.97 Hz. When the 1.001 flag represents that the reproduced signal relates to a frame frequency of 30 Hz, the 1.001 flag decision control circuit 18 controls the drum control portion 5 to rotate the drum 7 at a speed of 30 rps. Furthermore, the 1.001 flag decision control circuit 18 controls the tape control portion 6 to feed the magnetic tape 25 at a speed matching a recorded signal having a frame frequency of 30 Hz. On the other hand, when the 1.001 flag represents that the reproduced signal relates to a frame frequency of 29.97 Hz, the 1.001 flag decision control circuit 18 controls the drum control portion 5 to rotate the drum 7 at a speed of 29.97 rps. Furthermore, the 1.001 flag decision control circuit 18 controls the tape control portion 6 to feed the magnetic tape 25 at a speed matching a recorded signal having a frame frequency of 29.97 Hz.

The 1.001 flag decision control circuit 18 generates a frame-frequency control signal in response to the state of the 1.001 flag. The 1.001 flag decision control circuit 18 outputs the frame-frequency control signal to a data decoder 20.

The channel decoder 17 responds to the channel clock signal from the PLL circuit 27 and a data clock signal from a data clock generator 19, recovering first data from the output signal of the equalizer 26 and correcting the first data into second data in response to an error correction code signal therein before de-interleaving the second data into third data. The channel decoder 17 outputs the third data to the data decoder 20.

The channel decoder 17 is provided with a sequencer which determines timings of detection of the start and the end of effective data 52 or 55 (see FIG. 6) for every track. Since the effective data 52 and the effective data 55 are equal to each other in start and end timings, it is unnecessary to change the sequencer in accordance with the frame frequency to which the reproduced signal is related.

The channel decoder 17 periodically derives 1-track-corresponding data from the output signal of the equalizer 26. Specifically, the channel decoder 17 periodically uses the channel clock signal as a reference timing, and finds a first header in effective data 52 or 55 (see FIG. 6) in response to the reference timing. Thereby, the channel decoder 17 accurately recognizes the effective data 52 or 55. The channel decoder 17 de-interleaves the effective data 52 or 55, and corrects a data error or errors in response to an error correction code signal therein. Each time the resultant data reach a predetermined length, the process of deriving 1-track-corresponding data is stopped and the step of preparing a search for a next header is started.

The data decoder 20 decodes the output data from the channel decoder 17 into an original video signal in response to the data clock signal from the data clock generator 19 and the frame-frequency control signal from the 1.001 flag decision control circuit 18. The data decoder 20 controls the temporal positions (the timings) of frame sync signals in the decoding-resultant original video signal in accordance with the frame-frequency control signal. The decoding-resultant original video signal is also referred to as the reproduced video signal. The data decoder 20 outputs the reproduced video signal.

The data clock generator 19 feeds the data clock signal to the drum control portion 5 and the tape control portion 6. The data clock signal is used in operation of the drum control portion 5 and the tape control portion 6.

The rotational speed of the rotary drum 7 may be changed between two values different from 30 rps and 29.97 rps. For example, the two speed values have multiple relations with 30 rps and 29.97 rps.

What is claimed is:

1. A data recording and reproducing apparatus comprising:

a rotary head for recording a signal on a tape-like recording medium while successively forming tracks thereon, and for reproducing a signal from the tape-like recording medium, wherein each of the tracks has a front margin area, an effective data area, and a rear margin area;

first means for generating a flag representing which of different speeds the rotary head rotates at;

second means for inserting the flag generated by the first means into the signal before the signal is recorded on the tape-like recording medium by the rotary head to record the flag on the effective data area; and third means for maintaining a data rate of the signal recorded on the tape-like recording medium at a constant rate independent of which of the different speeds the rotary head rotates at, and for changing an amount of data recorded on the rear margin area in response to which of the different speeds the rotary head rotates at to cause the tracks to be equal in length independent of which of the different speeds the rotary head rotates at.

2. A data recording and reproducing apparatus comprising:

a rotary head for recording a signal on a tape-like recording medium while successively forming tracks thereon, and for reproducing a signal from the tape-like recording medium, wherein each of the tracks has a front margin area, an effective data area, and a rear margin area;

first means for generating a flag representing which of different speeds the rotary head rotates at;

second means for inserting the flag generated by the first means into the signal before the signal is recorded on the tape-like recording medium by the rotary head to record the flag on the effective data area;

third means for maintaining a data rate of the signal recorded on the tape-like recording medium at a constant rate independent of which of the different speeds the rotary head rotates at, and for changing an amount of data recorded on the rear margin area in response to which of the different speeds the rotary head rotates at to cause the tracks to be equal in length independent of which of the different speeds the rotary head rotates at;

an equalizer for subjecting the signal reproduced by the rotary head to a waveform equalization process, and for outputting a signal representing a result of the waveform equalization process;

a phase-locked loop for generating a channel clock signal on the basis of the signal outputted by the equalizer; and fourth means for extracting the flag from the signal outputted by the equalizer, for controlling rotation of the rotary drum in response to the extracted flag, and for controlling feed of the tape-like recording medium in response to the extracted flag to maintain a channel bit rate of the signal reproduced by the rotary head at a constant rate independent of which of the different speeds the rotary head rotates at.

3. A data recording and reproducing apparatus as recited in claim 1, wherein the different speeds relate to two different frequency values between which a frame frequency of the signal recorded by the rotary head is changeable.

4. A tape-like recording medium having tracks successively formed by a rotary head while a signal is recorded on the tracks by the rotary head, wherein each of the tracks has a front margin area, an effective data area, and a rear margin area, the effective data area being loaded with a flag representing which of different speeds the rotary head rotates at, wherein recording of the signal on the tracks by the rotary head is executed under conditions where a data rate of the signal recorded by the rotary head is maintained at a constant rate independent of which of the different speeds the rotary head rotates at, and an amount of data recorded on the rear margin area is controlled in response to which of the different speeds the rotary head rotates at to cause the tracks to be equal in length independent of which of the different speeds the rotary head rotates at.

5. An apparatus comprising:

first means for recording a digital video signal on a recording tape while successively forming tracks on the tape, the digital video signal having a changeable frame frequency, the digital video signal having a sequence of 1-track-corresponding portions assigned to the respective tracks, wherein each of the 1-track-corresponding portions includes a margin signal;

second means for maintaining a data rate of the digital video signal which is being recorded by the first means at a constant rate independent of the frame frequency of the digital video signal; and third means for changing a number of bits of the margin signal and a recording density of the digital video signal on the tape in response to the frame frequency of the digital video signal.

6. An apparatus as recited in claim 5, further comprising:

fourth means for generating a flag representing whether the frame frequency of the digital video signal is equal to a first predetermined value or a second predetermined value; and fifth means for inserting the flag generated by the fourth means into the digital video signal before the digital video signal is recorded by the first means.

7. An apparatus as recited in claim 5, wherein the margin signal comprises a dummy signal.

8. An apparatus comprising:

first means for reproducing a digital video signal from a recording tape, the digital video signal having a frame frequency changeable between a first predetermined value and a second predetermined value, the digital video signal containing a flag representing whether the frame frequency of the digital video signal is equal to the first predetermined value or the second predetermined value;

an equalizer for subjecting the digital video signal reproduced by the first means to a waveform equalization process independent of whether the frame frequency of the digital video signal is equal to the first predetermined value or the second predetermined value, and for outputting a signal representing a result of the waveform equalization process;

second means for detecting the flag in the signal outputted by the equalizer; and third means for controlling the reproducing of the digital video signal by the first means in response to the flag detected by the second means to maintain a data rate of the digital video signal which is being reproduced by the first means at a constant rate independent of whether the frame frequency of the digital video signal is equal to the first predetermined value or the second predetermined value.

* * * * *